(12) United States Patent
Choi et al.

(10) Patent No.: US 11,661,371 B2
(45) Date of Patent: *May 30, 2023

(54) COMPOSITION FOR ENAMEL, METHOD FOR PREPARING A COMPOSITION FOR ENAMEL, AND COOKING APPLIANCE

(71) Applicant: LG ELECTRONICS INC., Seoul (KR)

(72) Inventors: Suyeon Choi, Seoul (KR); Taeho Kim, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,359

(22) Filed: Dec. 10, 2020

(65) Prior Publication Data
US 2021/0171388 A1    Jun. 10, 2021

(30) Foreign Application Priority Data
Dec. 10, 2019  (KR) .................. 10-2019-0164055

(51) Int. Cl.
*C03C 8/06* (2006.01)
*F24C 15/00* (2006.01)
*C03C 8/02* (2006.01)

(52) U.S. Cl.
CPC .............. *C03C 8/02* (2013.01); *F24C 15/005* (2013.01)

(58) Field of Classification Search
CPC ............ C03C 8/02; C03C 8/04; F24C 15/005
See application file for complete search history.

(56) References Cited

U.S. PATENT DOCUMENTS

| | | | |
|---|---|---|---|
| 3,547,098 | A | 12/1970 | Lee |
| 6,511,931 | B1 | 1/2003 | Baldwin |
| 2004/0077477 | A1 | 4/2004 | Gazo |
| 2010/0009836 | A1 | 1/2010 | Sakoske |
| 2013/0299482 | A1 | 11/2013 | Kim et al. |

(Continued)

FOREIGN PATENT DOCUMENTS

| | | |
|---|---|---|
| EP | 2 662 340 | 11/2013 |
| EP | 3 650 414 | 5/2020 |

(Continued)

OTHER PUBLICATIONS

International Search Report dated Mar. 22, 2021 issued in International Application No. PCT/KR2020/017958.

(Continued)

*Primary Examiner* — Karl E Group
(74) *Attorney, Agent, or Firm* — Ked & Associates, LLP

(57) ABSTRACT

A composition for enamel may include 20 to 45 wt % of $SiO_2$; 1 to 15 wt % of $B_2O_3$, 10 to 20 wt % of one or more of $Na_2O$, $K_2O$, and $Li_2O$, 1 to 5 wt % of NaF, 1 to 10 wt % of ZnO, 5 to 15 wt % of $TiO_2$, 3 to 7 wt % of $MoO_3$; 5 to 15 wt % of $Bi_2O_3$, 1 to 5 wt % of $CeO_2$, and 1 to 10 wt % of one or more of $MnO_2$, $Fe_2O_3$, and $Co_3O_4$. The composition may be used to coat a cooking appliance for easy removal of contaminants at room temperature.

19 Claims, 2 Drawing Sheets

(56) References Cited

U.S. PATENT DOCUMENTS

| | | | |
|---|---|---|---|
| 2016/0244356 A1 | 8/2016 | Lecomte et al. | |
| 2018/0170797 A1 | 6/2018 | Gorecki et al. | |
| 2019/0071347 A1 | 3/2019 | Kim et al. | |
| 2020/0148583 A1* | 5/2020 | Choi | C03C 3/089 |
| 2020/0270167 A1* | 8/2020 | Choi | C03C 8/02 |
| 2021/0171389 A1* | 6/2021 | Choi | C03C 3/115 |

FOREIGN PATENT DOCUMENTS

| | | |
|---|---|---|
| EP | 3 699 156 | 8/2020 |
| EP | 3 786 122 | 3/2021 |
| JP | 2014-148465 | 8/2014 |
| KR | 10-2013-0125918 | 11/2013 |
| KR | 10-1476501 | 12/2014 |
| KR | 10-2018-0089988 | 8/2018 |
| KR | 10-2019-0027128 | 3/2019 |
| KR | 10-2019-0071660 | 6/2019 |
| KR | 10-2019-0120965 | 10/2019 |
| KR | 10-2019-0123571 | 11/2019 |
| WO | WO 03/008354 | 1/2003 |
| WO | WO 2011/108472 | 9/2011 |
| WO | WO 2017/058418 | 4/2017 |
| WO | WO 2019/208969 | 10/2019 |

OTHER PUBLICATIONS

International Search Report dated Apr. 5, 2021 issued in International Application No. PCT/KR2020/017949.
European Search Report dated Apr. 29, 2021 issued in EP Application No. 20212718.9.
European Search Report dated Apr. 30, 2021 issued in EP Application No. 20212715.5.

* cited by examiner

COMPOSITION FOR ENAMEL, METHOD FOR PREPARING A COMPOSITION FOR ENAMEL, AND COOKING APPLIANCE

CROSS-REFERENCE TO RELATED APPLICATION(S)

The present disclosure claims priority to and the benefit of Korean Patent Application No. 10-2019-0164055, filed in Korea on Dec. 10, 2019, the disclosure of which is incorporated herein by reference in its entirety.

BACKGROUND

1. Field

The present disclosure relates to a composition for enamel.

2. Background

Enamel may be a glassy glaze covering a surface of a metal plate. General enamel is used for cooking appliances such as a microwave or an oven. Cooking appliances such as an electric oven, a gas oven, etc. may cook food by using a heat source. Contaminants, etc. that occur in a cooking process may adhere to an inner wall of a cavity of the cooking appliance, and the inner wall of the cavity may need to be cleaned. The enamel may be coated on a surface of the inner wall of the cavity of the cooking appliance to ease removal of any contaminants fixed to the cooking appliance. In general, a pyrolysis method may be used to clean the inner wall of the cavity by reducing the contaminants to ashes by combusting the contaminants at a high temperature. A composition for enamel used in the pyrolysis method may include constituents of $P_2O_5$, $SiO_2$, $B_2O_3$, etc., which may be cleaned by heating for about 4 hours at 450° C. to 500° C. For example, U.S. Pat. No. 3,547,098 discloses a porcelain enamel for a self-cleaning oven.

Due to such a high temperature, the existing compositions for enamel may require a large amount of energy during cleaning. Also, the enamel may not otherwise be easily cleaned if the enamel is not processed by heat treatment at a high temperature. Therefore, an application of such an enamel may be limited to the inner surface of the cooking appliance and may not be beneficial at an outer surface of the cooking appliance. In addition, such an enamel may require a soaking process using water for a predetermined time so as to remove oil-based contaminants coming from cooking pork, beef, and poultry, further complicating a cleaning process.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
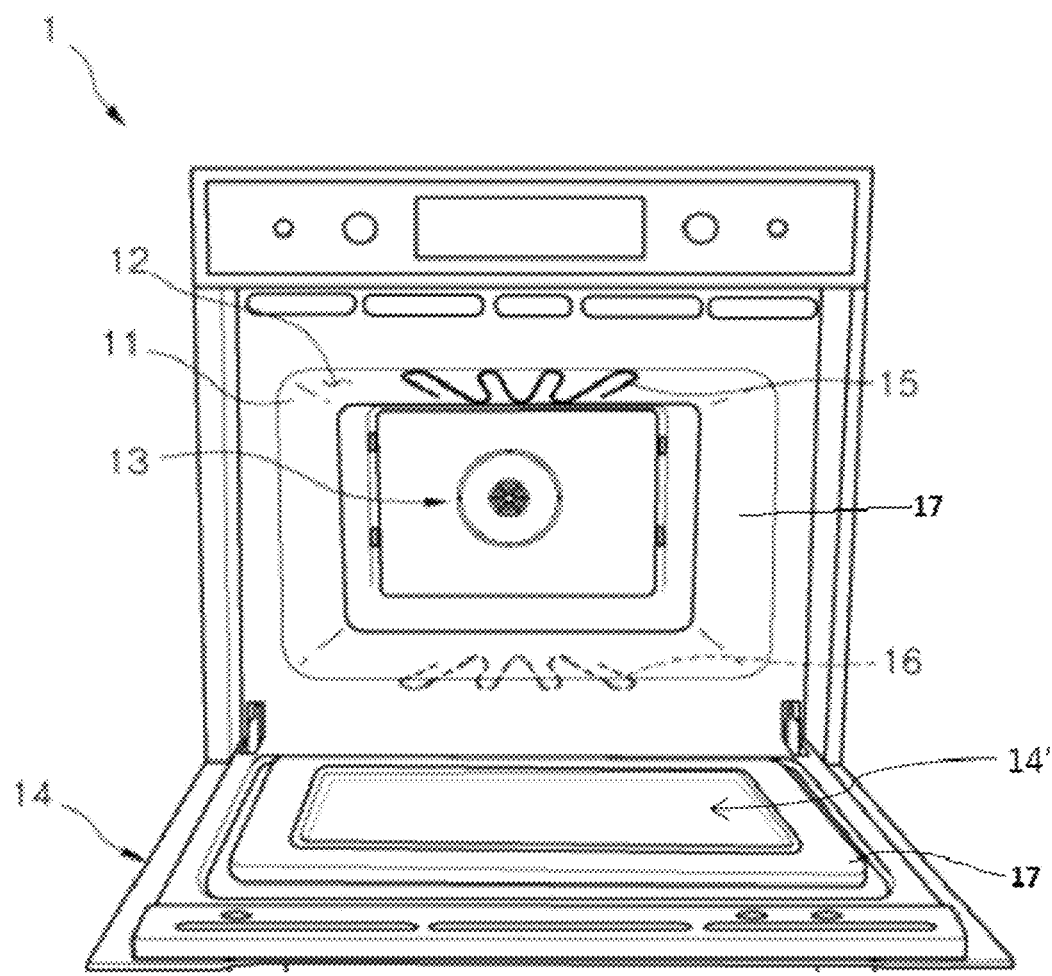
FIG. 1 is a front view showing a cooking appliance according to an example of the present disclosure.
Figure 2:
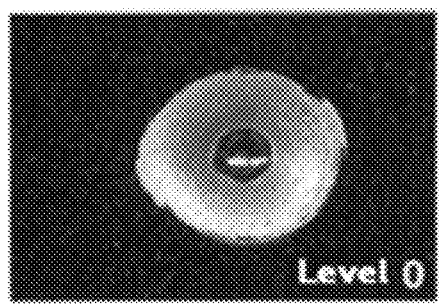
FIG. 2 is a photo related to adhesion evaluation criteria of an example and a comparative example.
Figure 2:
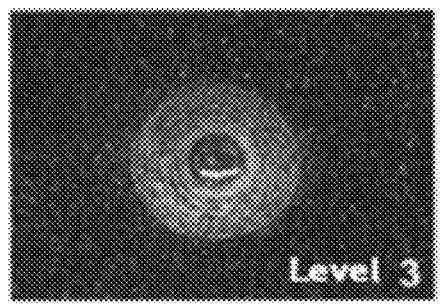
Figure 2:
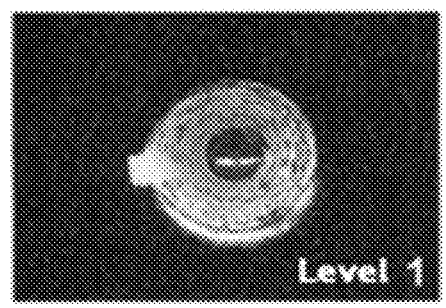
Figure 2:
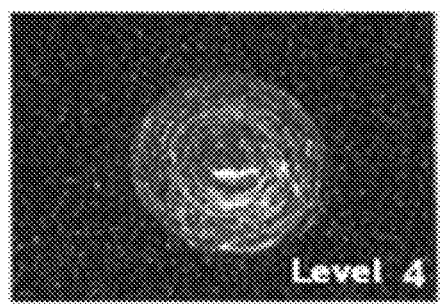
Figure 2:
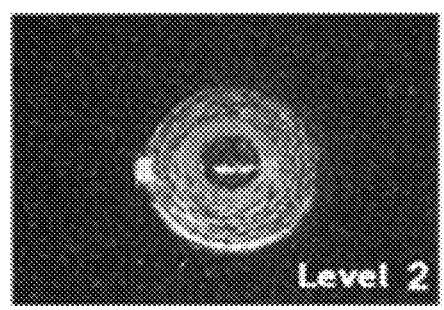
Figure 2:
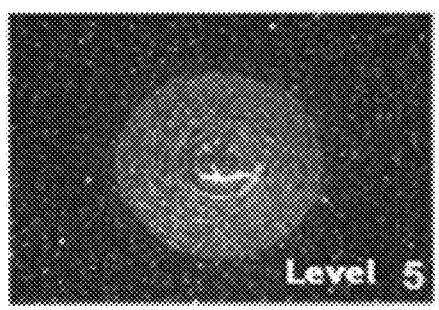

Hereinafter, a composition for enamel according to some examples of the present disclosure, a method for preparation thereof, and a cooking appliance are described.

<Composition for Enamel>

A composition for enamel according to the present disclosure may include 20 to 45 weight percent (wt %) of silicon dioxide ($SiO_2$); 1 to 15 wt % of boron trioxide or diboron trioxide ($B_2O_3$); 10 to 20 wt % of one or more of sodium oxide ($Na_2O$), potassium oxide ($K_2O$), and/or lithium oxide ($Li_2O$); 1 to 5 wt % of sodium fluoride (NaF); 1 to 10 wt % of zinc oxide (ZnO); 5 to 15 wt % of titanium dioxide ($TiO_2$); 3 to 7 wt % of molybdenum trioxide or molybdenum(IV) oxide ($MoO_3$); 5 to 15 wt % of bismuth oxide or bismuth(III) oxide $Bi_2O_3$; 1 to 5 wt % of cerium dioxide or cerium(IV) oxide ($CeO_2$); and 1 to 10 wt % of one or more of manganese dioxide or manganese(IV) oxide ($MnO_2$), ferric oxide or iron(III) oxide ($Fe_2O_3$), and/or cobalt oxide or cobalt(II, IIII) oxide ($Co_3O_4$). A total content of $Na_2O$, $K_2O$, and $Li_2O$ may be 10 to 20 wt %. A total content of $MnO_2$, $Fe_2O_3$, and $Co_3O_4$ may be 1 to 10 wt %.

$SiO_2$ may be a constituent forming a glass structure that strengthens a frame of the glass structure so that chemical resistance of the composition for enamel may be enhanced, and expression of characteristics of a metal oxide acting as a catalyst may be eased. A catalytic metal oxide may be inferior in respect of thermal resistance or chemical resistance compared to other constituents, and the catalytic metal oxide may not be contained in a large amount. However, if a certain amount of $SiO_2$ is contained in a glass composition, solubility of the catalytic metal oxide may be enhanced within the glass because $SiO_2$ has a structure having a large a pore size. A content ratio of $SiO_2$ and the catalytic metal oxide may be controlled or predetermined so that excellent thermal resistance and chemical resistance may be obtained, and characteristics of the catalytic metal oxide may be expressed. $SiO_2$ may be included in the composition for enamel in a range of 20 to 45 wt %. If $SiO_2$ exceeds 45 wt %, addition of other constituents may be interfered with, which may inhibit or reduce cleaning functions or properties. If $SiO_2$ is less than 20 wt %, a silicate-based glass composition according to the present disclosure may collapse.

$B_2O_3$ may help form a glass composition and may help with uniformity in a melting process of each of the constituents of the glass composition. Also, $B_2O_3$ may help to control a coefficient of thermal expansion and a fusion flow of the glass composition, enhancing coating performance. $B_2O_3$ may help maintain proper viscosity upon a calcination process of enamel and so that crystallization of the glass composition may not occur or be less likely to occur. $B_2O_3$ may be contained in the glass composition in a range of 1 to 15 wt %. If $B_2O_3$ exceeds 15 wt %, addition of other constituents may be interfered with, which may inhibit or reduce performance or cleaning functions, properties, or capabilities. If $B_2O_3$ is less than 1 wt %, the glass composition may collapse or crystallize.

$Li_2O$, $Na_2O$, and $K_2O$ may enhance cleaning capabilities of the enamel composition. One or more of $Li_2O$, $Na_2O$, and/or $K_2O$ may be contained in a range of 10 to 20 wt % in the enamel composition. If one or more of $Li_2O$, $Na_2O$, and/or $K_2O$ exceeds 20 wt %, a coefficient of thermal expansion of glass may greatly increase and coating performance may be lowered. If a content of one or more of $Li_2O$, $Na_2O$, and $K_2O$ is 10 wt % or less, cleaning capabilities may be reduced. The composition for enamel according to the present disclosure may include 5 wt % or more of $Na_2O$.

NaF may also enhance the cleaning function of the enamel composition. NaF may be contained in a range of 1 to 5 wt % in the composition for enamel. If a content of NaF exceeds 5 wt %, addition of other constituents may be interfered with, which may reduce durability. If a content of NaF is 1 wt % or less, cleaning capabilities may be reduced.

ZnO may be an intermediate oxide to balance a network formation oxide ($SiO_2$ and $B_2O_3$) and an alkali oxide ($Li_2O$, $Na_2O$, and $K_2O$). In the present disclosure, ZnO may be contained in a range of 1 to 10 wt % in the composition for enamel. If a content of Zno exceeds 10 wt %, addition of other constituents may be interfered with, which may lower durability or cleaning capabilities. If a content of ZnO is 1 wt % or less, the cleaning capabilities may be reduced. $TiO_2$, $MoO_3$, $Bi_2O_3$, and $CeO_2$ may enhance cleaning performance with respect to contaminants such as oil-based contaminants or saccharides and may improve adhesion performance of the composition for enamel when coated on a substrate.

In the present disclosure, 5 to 15 wt % of $TiO_2$, 3 to 7 wt % of $MoO_3$, 5 to 15 wt % of $Bi_2O_3$, and 1 to 5 wt % of $CeO_2$ may be included. If the composition for enamel includes a minimum constituent content or less of the above constituents, cleaning performance with respect to contaminants such as oil-based contaminants and saccharides may be weakened and adhesion performance to the substrate may be lowered. On the contrary, if the composition for enamel of the present disclosure includes more than a maximum constituent content of the above constituents, addition of other constituents may be interfered with, and durability or chemical resistance may be lowered.

In addition, the composition for enamel may include 1 to 10 wt % of one or more of $MnO_2$, $Fe_2O_3$, and/or $Co_3O_4$ to further enhance adhesion performance to a substrate of a steel plate. If one or more of $MnO_2$, $Fe_2O_3$, and/or $Co_3O_4$ is 1 wt % or less, adhesion performance between an enamel coating and the substrate of the steel plate may be weakened. On the contrary, if one or more of $MnO_2$, $Fe_2O_3$, and/or $Co_3O_4$ exceeds 10 wt %, addition of other constituents may be interfered with and cleaning performance may be weakened.

$TiO_2$, $MoO_3$, $MnO_2$, and/or $Fe_2O_3$ may enhance cleaning performance with respect to oil-based contaminants. If $TiO_2$ and $MoO_3$ are concurrently applied to a silicate-based composition, such as the composition for enamel of the present disclosure, contaminants may be filmized or form a film due to catalytic activity of $TiO_2$ and $MoO_3$. As previously described, the composition for enamel of the present disclosure may include 5 to 15 wt % of $TiO_2$ and 3 to 7 wt % of $MoO_3$.

$Bi_2O_3$, $CeO_2$, and $Co_3O_4$ may enhance cleaning performance with respect to saccharide contaminants. If a large amount of $Bi_2O_3$ is applied to a silicate-based composition, such as the composition for enamel of the present disclosure, saccharide contaminants may be easily removed by a wet sponge even at a room temperature due to catalytic activity of $Bi_2O_3$ to saccharide contaminants. Balance of all constituents is important to maximize cleaning performance of the enamel coating.

Next, as previously described, $Co_3O_4$, $Fe_2O_3$, and $MnO_2$ may enhance adhesion of the enamel coating. Also, $Co_3O_4$, $Fe_2O_3$, and $MnO_2$ may be applied as a color realization element of the enamel coating.

The composition for enamel may include catalytic oxide constituents ($TiO_2$, $MoO_3$, $Bi_2O_3$, $CeO_2$, and one or more of $MnO_2$, $Fe_2O_3$, and/or $Co_3O_4$) in which a total content thereof is 40 wt % or less. If the catalytic oxides exceed 40 wt %, durability and chemical resistance of the enamel coating may be lowered. A total content of the catalytic oxides may be controlled accordingly in the composition for enamel of the present disclosure.

The composition for enamel according to the present disclosure may have a composition ratio in which constituents for realizing glass and constituents having catalytic performance are optimized. Cleaning may be possible with respect to all contaminants without soaking in water at a room temperature.

<Method of Preparing a Composition for Enamel>

A method of preparing the composition for enamel according to the present disclosure may include steps of providing a material of the composition for the enamel containing all constituents as noted above, melting the material of the composition for the enamel, and quenching a melted material of the composition, thereby forming the composition for the enamel.

The material of the composition for enamel may be sufficiently mixed, and then the material of the composition for enamel may be melted. The material of the composition may be melted in a temperature range of 1,200 to 1,500° C. for 1 to 2 hours. The melted material of the composition may be quenched using a chiller, etc., and/or a quenching roller. Accordingly, the composition for enamel may be prepared.

<Cooking Appliance>

The finalized composition for enamel may be coated on a surface of a target object (e.g., a part of a metal plate, a glass plate, and/or a cooking appliance). The composition may be coated on an outer surface of a cooking appliance where heat treatment may not be possible.

Referring to FIG. 1, a cooking appliance 1 according to the present disclosure may include a cavity 11 in which a cooking space 12 is formed, a door 14 to selectively open and/or close the cooking space 12, at least one heat source 13, 15, and/or 16 providing heat to heat or cook food in the cooking space 12, and a coating layer 17 coated on an inner surface of the cavity 11 and/or an inner surface of the door 14 and formed by the composition for enamel according to the present disclosure.

The cavity 11 may have a hexahedron shape having at least one opened face or surface. The heat source 13, 15, 16 may include a convection assembly 13 that allows heated air to be discharged inside the cavity 11, an upper heater 15 provided at an upper part or side of the cavity 11, and a lower heater 16 provided at a lower part or side of the cavity 11. The upper heater 15 and the lower heater 16 may be equipped inside or outside the cavity 11. The heat sources 13, 15, and/or 16 may not necessarily include the convection assembly 13, the upper heater 15, and the lower heater 16. The heat source 13, 15, 16 may include any one or more of the convection assembly 13, the upper heater 15, and the lower heater 16, or alternatively may include different heaters. Embodiments disclosed herein are not limited.

The composition for enamel according to the present disclosure may be coated on an inner surface of the cavity 11 of the cooking appliance 1, an inner surface of the door 14, or an inner surface of a door glass 14' by a dry process or a wet process to form the coating layer 17. The cavity 11 and the door 14 may be formed as a metal plate. The coating layer 17 using the composition for enamel according to the present disclosure may be directly coated on the metal plate as a single layer.

Also, the composition for enamel according to the present disclosure may be applied to the cooking appliance including a glass plate and at least one heat source provided below the glass plate. The coating layer 17 that is formed by the glass composition according to the present disclosure may be provided at an upper portion of the glass plate.

Hereinafter, a specific embodiment of the present disclosure is examined based on an example.

Example

<Preparation of Glass Composition>

The glass composition having a composition ratio described in Table 1 below was prepared. A raw material of each constituent was sufficiently mixed in a V-mixer for 3 hours. Here, $Na_2CO_3$, $K_2CO_3$, and $Li_2CO_3$ were used as raw materials of $Na_2O$, $K_2O$, and $Li_2O$, respectively. With respect to the other constituents, the same constituent as that described in Table 1 was used. A mixed material was sufficiently melted at 1,300° C. for 1 hour and 30 minutes and was quenched in a quenching roller, thereby yielding a glass cullet.

0.1 wt % to 1 wt % of organopolysiloxane (DOW Corning 1107) was mixed with the glass cullet yielded by the above process. A mixture thereof was ground for about 5 hours using a ball mill and then was passed through a 325 mesh sheave (ASTM C285-88). Powder that passed through the mesh sheave was used as a frit of the composition for enamel.

TABLE 1

| Constituent (wt %) | Example 1 | Example 2 | Example 3 | Comparative example 1 | Comparative example 2 | Comparative example 3 |
|---|---|---|---|---|---|---|
| $SiO_2$ | 38.11 | 40.70 | 37.30 | 38.30 | 42.00 | 36.00 |
| $B_2O_3$ | 9.02 | 8.39 | 10.30 | 13.11 | 7.32 | 10.32 |
| $Na_2O$ | 10.96 | 12.46 | 12.34 | 10.75 | 14.00 | 10.11 |
| $K_2O$ | 2.08 | 1.12 | 2.11 | 6.52 | 6.13 | 6.13 |
| $Li_2O$ | 1.00 | 0 | 0 | 2.54 | 2.39 | 2.39 |
| NaF | 1.63 | 2.74 | 2.71 | 3.62 | 3.41 | 3.41 |
| $TiO_2$ | 11.14 | 11.60 | 9.50 | 14.17 | 19.00 | 13.32 |
| $MnO_2$ | 0 | 0.69 | 0.68 | 0 | 0 | 0 |
| $Fe_2O_3$ | 0.56 | 0 | 0.99 | 0 | 0 | 0 |
| $Co_3O_4$ | 1.93 | 1.90 | 2.88 | 0 | 0 | 0 |
| ZnO | 8.51 | 4.70 | 4.65 | 10.98 | 4.00 | 10.32 |
| $MoO_3$ | 4.81 | 5.01 | 4.96 | 0 | 1.75 | 3.83 |
| $Bi_2O_3$ | 8.93 | 9.31 | 10.20 | 0 | 0 | 2.83 |
| $CeO_2$ | 1.32 | 1.38 | 1.36 | 0 | 0 | 1.33 |

Based on the values of Table 1, materials for the composition may include $SiO_2$ provided in a range of 36 to 42 wt %, $B_2O_3$ provided in a range of 7 to 12 wt %, $Na_2O$ provided in a range of 9 to 14 wt %, $K_2O$ provided in a range of 0 to 3 wt %, $Li_2O$ provided in a range of 0 to 2 wt %, NaF provided in a range of 1 to 3 wt %, ZnO provided in a range of 3 to 10 wt %, $TiO_2$ provided in a range of 8 to 13 wt %, $MoO_3$ provided in a range of 4 to 6 wt %, $Bi_2O_3$ provided in a range of 7 to 12 wt %, $CeO_2$ provided in a range of 1 to 3 wt %, $MnO_2$ provided in a range of 0 to 2 wt %, $Fe_2O_3$ provided in a range of 0 to 2 wt %, and/or $Co_3O_4$ provided in a range of 0 to 3 wt %.

Based on the values of Table 1, materials for the composition may include $SiO_2$ provided in a range of 37 to 41 wt %, $B_2O_3$ provided in a range of 8 to 11 wt %, $Na_2O$ provided in a range of 6 to 13 wt %, $K_2O$ provided in a range of 0 to 2.5 wt %, $Li_2O$ provided in a range of 0 to 1.5 wt %, NaF provided in a range of 1.4 to 2.9 wt %, ZnO provided in a range of 4 to 9 wt %, $TiO_2$ provided in a range of 9 to 12 wt %, $MoO_3$ provided in a range of 4.5 to 5.5 wt %, $Bi_2O_3$ provided in a range of 8 to 11 wt %, $CeO_2$ provided in a range of 1 to 2 wt %, $MnO_2$ provided in a range of 0 to 1 wt %, $Fe_2O_3$ provided in a range of 0 to 1.5 wt %, and/or $Co_3O_4$ provided in a range of 1 to 3 wt %.

Based on the values in Table 1, materials for the composition may include $SiO_2$ provided in a range of 37.2 to 40.8 wt %, $B_2O_3$ provided in a range of 8.3 to 10.5 wt %, $Na_2O$ provided in a range of 10.5 to 12.6 wt %, $K_2O$ provided in a range of 1.1 to 2.2 wt %, $Li_2O$ provided in a range of 0 to 1.1 wt %, NaF provided in a range of 1.5 to 2.8 wt %, ZnO provided in a range of 4.5 to 8.8 wt %, $TiO_2$ provided in a range of 9.3 to 11.7 wt %, $MoO_3$ provided in a range of 4.7 to 5.1 wt %, $Bi_2O_3$ provided in a range of 8.5 to 10.5 wt %, $CeO_2$ provided in a range of 1.2 to 1.5 wt %, $MnO_2$ provided in a range of 0 to 0.8 wt %, $Fe_2O_3$ provided in a range of 0 to 1.2 wt %, or $Co_3O_4$ provided in a range of 1.8 to 3 wt %. $SiO_2$ provided in a range of 37.30 to 40.70 wt %, $B_2O_3$ provided in a range of 8.39 to 10.30 wt %, $Na_2O$ provided in a range of 10.96 to 12.46 wt %, $K_2O$ provided in a range of 1.12 to 2.11 wt %, $Li_2O$ provided in a range of 0 to 1.00 wt %, NaF provided in a range of 1.63 to 2.74 wt %, ZnO provided in a range of 4.65 to 8.51 wt %, $TiO_2$ provided in a range of 9.50 to 11.60 wt %, $MoO_3$ provided in a range of 4.81 to 5.01 wt %, $Bi_2O_3$ provided in a range of 8.93 to 10.20 wt %, $CeO_2$ provided in a range of 1.32 to 1.38 wt %, $MnO_2$ provided in a range of 0 to 0.69 wt %, $Fe_2O_3$ provided in a range of 0 to 0.99 wt %, or $Co_3O_4$ provided in a range of 1.90 to 2.88 wt %.

Based on the values in Table 1, a total content of $Na_2O$, $K_2O$, and $Li_2O$ may be provided in a range of 12 to 16 wt %. A total content of $MnO_2$, $Fe_2O_3$, and $Co_3O_4$ provided in a range of 1 to 5 wt %. A total content of $Na_2O$, $K_2O$, and $Li_2O$ may be provided in a range of 13.5 to 15.0%. A total content of $MnO_2$, $Fe_2O_3$, and $Co_3O_4$ may be provided in a range of 2.4 to 4.6 wt %.

<Preparation of Sample of Composition for Enamel>

The frit for enamel prepared as the above was sprayed on a low carbon steel sheet that has 200×200 (mm) and 1 (mm) or less of thickness using a general corona discharge gun. A voltage of the corona discharge gun was controlled in a range of 40 kV to 100 kV. An amount of the frit sprayed on the low carbon steel sheet was about 300 g/m². The low carbon steel sheet on which the frit for enamel as the above was sprayed was calcinated for 300 to 450 seconds in a temperature range of 780° C. to 850° C.

Experimental Example 1—Evaluation for Cleaning Performance

With respect to the samples according to the example and the comparative example, cleaning performance was evaluated as below.

A method for measuring cleaning performance is as follows. About 1 g of chickens' oil as a contaminant was evenly and thinly spread with a brush on a surface of the samples according to the example and the comparative example. Next, test samples on which the contaminant was spread was put into a thermostat so that the contaminant was fixed thereto in a temperature condition of 270° C. and a time condition of 30 minutes. After fixation, the test samples were naturally cooled. Then, the chickens' oil was wiped by 3 kgf or less of a force using a frying pan-only sponge that was wet with cold water. A part wiped from a surface of the contaminated enamel was uniformized by using a bar having a flat bottom and a diameter is 5 cm. Here, the number of wiping swipes or reciprocations is measured, wherein the number is defined as the number of cleaning reciprocations. An index of evaluation is described as a table in a left side below. Also, in the case that the contaminant is tomato sources, the cleaning performance was evaluated in the same method as the above.

TABLE 2

| The number of cleaning reciprocations | Level |
|---|---|
| ~5 | 5 |
| ~15 | 4 |
| ~25 | 3 |
| ~50 | 2 |
| 50~ | 1 |

Experimental Example 2—Evaluation of Adhesion Performance

Adhesion of the example and the comparative example was measured. As a method of measuring adhesion, Dupont Impact Tester (ASTM D1794, JIS K5400) was used. Test samples were placed at a center of a sample stage, and a steel ball having about 25.4 nm (1 inch) of a diameter was installed at a center of a planar portion of the test samples. Then, an iron piece having 2 kg in weight was free-fallen at 300 nm in height to examine a state of peeling. Criteria of determining an adhesion level are based on criteria shown in FIG. 3.

<Test Results>

Test results of the above experimental examples were described in Table 3.

TABLE 3

| | Example 1 | Example 2 | Example 3 | Comparative example 1 | Comparative example 2 | Comparative example 3 |
|---|---|---|---|---|---|---|
| Cleaning Performance with respect to chickens' oil | Lv. 5 | Lv. 5 | Lv. 5 | Lv. 2 | Lv. 3 | Lv. 5 |
| Cleaning Performance with respect to tomato sources | Lv. 4 | Lv. 5 | Lv. 5 | Lv. 1 | Lv. 1 | Lv. 2 |
| Adhesion | Lv. 3 | Lv. 4 | Lv. 5 | Lv. 0 | Lv. 0 | Lv. 1 |

As the test results, all contaminants of samples according to examples 1 to 3 were easily removed at a room temperature. On the contrary, all contaminants of comparative examples were not easily removed at a room temperature. In addition, the examples have excellent cleaning performance and also excellent adhesion. However, it was confirmed that comparative examples do not have good adhesion.

Embodiments disclosed herein may provide a new composition for enamel in that cleaning is possible with respect to all contaminants in a room temperature. Embodiments disclosed herein may provide a new composition for enamel in that cleaning is possible with respect to all contaminants without soaking in water. Embodiments disclosed herein may provide a new composition for enamel where cleaning is possible without soaking in water at a room temperature and that also has excellent durability.

Objectives of the present disclosure are not limited to the above-described ones. Additionally, other objectives and advantages that have not been mentioned may be clearly understood from the description and may be more clearly understood from embodiments of the present disclosure. Further, it will be understood that the objectives and advantages of the present disclosure may be realized via means and combinations thereof that are described in the appended claims.

In order to be cleaned with respect to all contaminants without soaking in water at a room temperature, the composition for enamel according to the present disclosure may have a configuration of including a silicate-based component and a catalytic oxide in a new composition ratio. The composition for enamel according to the present disclosure may include $SiO_2$, $B_2O_3$, $R_2O$ (one or more of $Na_2O$, $K_2O$, and/or $Li_2O$), NaF, ZnO, $TiO_2$, $MoO_3$, $Bi_2O_3$, $CeO_2$, and one or more of $MnO_2$, $Fe_2O_3$, and/or $Co_3O_4$ in a new composition ratio. Also, the composition for enamel according to the present disclosure may include 40% by weight (hereinafter referred to as "wt %") or less of $TiO_2$, $MoO_3$, $Bi_2O_3$, $CeO_2$, and one or more of $MnO_2$, $Fe_2O_3$, and/or $Co_3O_4$ in order to increase or maximize chemical resistance and durability.

Based on the values of Table 1, materials for the composition may include $SiO_2$ provided in a range of 36 to 42 wt %, $B_2O_3$ provided in a range of 7 to 12 wt %, $Na_2O$ provided in a range of 9 to 14 wt %, $K_2O$ provided in a range of 0 to 3 wt %, $Li_2O$ provided in a range of 0 to 2 wt %, NaF provided in a range of 1 to 3 wt %, ZnO provided in a range of 3 to 10 wt %, $TiO_2$ provided in a range of 8 to 13 wt %, $MoO_3$ provided in a range of 4 to 6 wt %, $Bi_2O_3$ provided in a range of 7 to 12 wt %, $CeO_2$ provided in a range of 1 to 3 wt %, $MnO_2$ provided in a range of 0 to 2 wt %, $Fe_2O_3$ provided in a range of 0 to 2 wt %, and/or $Co_3O_4$ provided in a range of 0 to 3 wt %.

Based on the values of Table 1, materials for the composition may include $SiO_2$ provided in a range of 37 to 41 wt %, $B_2O_3$ provided in a range of 8 to 11 wt %, $Na_2O$ provided in a range of 6 to 13 wt %, $K_2O$ provided in a range of 0 to 2.5 wt %, $Li_2O$ provided in a range of 0 to 1.5 wt %, NaF provided in a range of 1.4 to 2.9 wt %, ZnO provided in a range of 4 to 9 wt %, $TiO_2$ provided in a range of 9 to 12 wt %, $MoO_3$ provided in a range of 4.5 to 5.5 wt %, $Bi_2O_3$ provided in a range of 8 to 11 wt %, $CeO_2$ provided in a range of 1 to 2 wt %, $MnO_2$ provided in a range of 0 to 1 wt %, $Fe_2O_3$ provided in a range of 0 to 1.5 wt %, and/or $Co_3O_4$ provided in a range of 1 to 3 wt %.

Based on the values in Table 1, materials for the composition may include $SiO_2$ provided in a range of 37.2 to 40.8 wt %, $B_2O_3$ provided in a range of 8.3 to 10.5 wt %, $Na_2O$ provided in a range of 10.5 to 12.6 wt %, $K_2O$ provided in a range of 1.1 to 2.2 wt %, $Li_2O$ provided in a range of 0 to 1.1 wt %, NaF provided in a range of 1.5 to 2.8 wt %, ZnO provided in a range of 4.5 to 8.8 wt %, $TiO_2$ provided in a range of 9.3 to 11.7 wt %, $MoO_3$ provided in a range of 4.7 to 5.1 wt %, $Bi_2O_3$ provided in a range of 8.5 to 10.5 wt %, $CeO_2$ provided in a range of 1.2 to 1.5 wt %, $MnO_2$ provided in a range of 0 to 0.8 wt %, $Fe_2O_3$ provided in a range of 0 to 1.2 wt %, or $Co_3O_4$ provided in a range of 1.8 to 3 wt %. $SiO_2$ provided in a range of 37.30 to 40.70 wt %, $B_2O_3$ provided in a range of 8.39 to 10.30 wt %, $Na_2O$ provided in a range of 10.96 to 12.46 wt %, $K_2O$ provided in a range of 1.12 to 2.11 wt %, $Li_2O$ provided in a range of 0 to 1.00 wt %, NaF provided in a range of 1.63 to 2.74 wt %, ZnO provided in a range of 4.65 to 8.51 wt %, $TiO_2$ provided in a range of 9.50 to 11.60 wt %, $MoO_3$ provided in a range of 4.81 to 5.01 wt %, $Bi_2O_3$ provided in a range of 8.93 to 10.20 wt %, $CeO_2$ provided in a range of 1.32 to 1.38 wt %, $MnO_2$ provided in a range of 0 to 0.69 wt %, $Fe_2O_3$ provided in a range of 0 to 0.99 wt %, or $Co_3O_4$ provided in a range of 1.90 to 2.88 wt %.

Based on the values in Table 1, a total content of $Na_2O$, $K_2O$, and $Li_2O$ may be provided in a range of 12 to 16 wt %. A total content of $MnO_2$, $Fe_2O_3$, and $Co_3O_4$ provided in a range of 1 to 5 wt %. A total content of $Na_2O$, $K_2O$, and $Li_2O$ may be provided in a range of 13.5 to 15.0%. A total content of $MnO_2$, $Fe_2O_3$, and $Co_3O_4$ may be provided in a range of 2.4 to 4.6 wt %.

This application is related to co-pending U.S. application Ser. No. 17/117,440 filed on Dec. 10, 2020, the entire contents of which are incorporated by reference herein.

The composition for enamel according to the present disclosure may be cleaned with respect to all contaminants at a room temperature. Also, the composition for enamel according to the present disclosure may be cleaned with respect to all contaminants without soaking in water. The composition for enamel according to the present disclosure may be cleaned without soaking in water at a room temperature and also has excellent durability.

In addition to effects as the above, specific effects of the present disclosure may be described together with describing specific matters for implementing the present disclosure. The present disclosure has been described with reference to the embodiments illustrated in the drawings. However, it is obvious that the disclosure may be changed by one having ordinary skill in the art to which the disclosure pertains in various different forms within the scope of the technical spirit of the disclosure. Therefore, the present disclosure is not limited to the embodiments and the drawings set forth herein. Further, even though action and effects according to configuration of the present disclosure are not definitely described in the description of embodiments of the present disclosure, it is certain that predictable effects resulted from the relevant configuration should be also admitted.

The pre-described objectives, features, and advantages will be described specifically hereinafter referring to the attached drawings; therefore those skilled in the art may easily realize the technical sprit of the present disclosure. In describing the present disclosure, the detailed description of known technologies in relation to the present disclosure will be omitted if it is deemed to make the gist of the present disclosure unnecessarily vague. Throughout the drawings, identical reference numerals may denote identical or similar components.

When any component is described as being "at an upper portion (or a lower portion)" of a component, or "on (or under)" a component, any component may be placed on the upper surface (or the lower surface) of the component, and an additional component may be interposed between the component and any component placed on (or under) the component. When a component is described as being "connected," "coupled" or "linked" to another component, the component may be directly connected or able to be linked to another component; however, it is also to be understood that an additional component may be "interposed" between the two components, or the two components may be "connected," "coupled" or "linked" through an additional component.

In a whole of specification, each component may be singular or plural as long as there is no description particularly opposite to the above. A singular expression used in this specification includes a plural expression as long as the expression is not definitely differently indicated in the context. In the present application, the term "configure" or "include," etc. should not be construed to necessarily include all of various components or various steps described in specification. It should be construed such that some components or some steps of the above may not be included, or additional components or steps may be further included.

In the whole of specification, when the term "A and/or B" is used, the term means A, B, or A and B as long as there is no description particularly opposite to the above. When the term "C to D" is used, the term means C or more and D or less as long as there is no description particularly opposite to the above.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A composition comprising:
   20 to 45 weight percent (wt %) of silicon dioxide ($SiO_2$);
   1 to 15 wt % of diboron trioxide ($B_2O_3$);
   10 to 20 wt % of at least one of sodium oxide ($Na_2O$), potassium oxide ($K_2O$), or lithium oxide ($Li_2O$);
   1 to 5 wt % of sodium fluoride (NaF);
   1 to 10 wt % of zinc oxide (ZnO);
   5 to 15 wt % of titanium dioxide ($TiO_2$);
   3 to 7 wt % of molybdenum trioxide ($MoO_3$);
   5 to 15 wt % of bismuth oxide ($Bi_2O_3$);
   1 to 5 wt % of cerium dioxide ($CeO_2$); and
   more than 5 to 10 wt % of at least one of manganese dioxide ($MnO_2$), ferric oxide ($Fe_2O_3$), or cobalt oxide ($Co_3O_4$).

2. The composition claim 1, comprising 5 wt % or more of $Na_2O$.

3. The composition of claim 1, wherein a total content of $TiO_2$, $MoO_3$, $Bi_2O_3$, $CeO_2$, and the at least one of $MnO_2$, $Fe_2O_3$, or $Co_3O_4$ is 40 wt % or less.

4. The composition of claim 1, wherein:
   the $SiO_2$ is provided in a range of 36 to 42 wt %;
   the $B_2O_3$ is provided in a range of 7 to 12 wt %;
   $Na_2O$ is provided in a range of 9 to 14 wt %;
   $K_2O$ is provided in a range of 0 to 3 wt %;
   $Li_2O$ is provided in a range of 0 to 2 wt %;
   NaF is provided in a range of 1 to 3 wt %;
   ZnO is provided in a range of 3 to 10 wt %;
   $TiO_2$ is provided in a range of 8 to 13 wt %;
   $MoO_3$ is provided in a range of 4 to 6 wt %;
   $Bi_2O_3$ is provided in a range of 7 to 12 wt %; and
   $CeO_2$ is provided in a range of 1 to 3 wt %.

5. The composition of claim 4, wherein:
   the $SiO_2$ is provided in a range of 37 to 41 wt %;
   the $B_2O_3$ is provided in a range of 8 to 11 wt %;
   $Na_2O$ is provided in a range of 6 to 13 wt %;
   $K_2O$ is provided in a range of 0 to 2.5 wt %;
   $Li_2O$ is provided in a range of 0 to 1.5 wt %;
   NaF is provided in a range of 1.4 to 2.9 wt %;
   ZnO is provided in a range of 4 to 9 wt %;
   $TiO_2$ is provided in a range of 9 to 12 wt %;
   $MoO_3$ is provided in a range of 4.5 to 5.5 wt %;
   $Bi_2O_3$ is provided in a range of 8 to 11 wt %; and
   $CeO_2$ is provided in a range of 1 to 2 wt %.

6. The composition of claim 5, wherein at least one of:
   $SiO_2$ is provided in a range of 37.2 to 40.8 wt %;
   $B_2O_3$ is provided in a range of 8.3 to 10.5 wt %;
   $Na_2O$ is provided in a range of 10.5 to 12.6 wt %;
   $K_2O$ is provided in a range of 1.1 to 2.2 wt %;
   $Li_2O$ is provided in a range of 0 to 1.1 wt %;
   NaF is provided in a range of 1.5 to 2.8 wt %;
   ZnO is provided in a range of 4.5 to 8.8 wt %;
   $TiO_2$ is provided in a range of 9.3 to 11.7 wt %;
   $MoO_3$ is provided in a range of 4.7 to 5.1 wt %;
   $Bi_2O_3$ is provided in a range of 8.5 to 10.5 wt %; and
   $CeO_2$ is provided in a range of 1.2 to 1.5 wt %.

7. The composition of claim 6, wherein at least one of:
   $SiO_2$ is provided in a range of 37.30 to 40.70 wt %;
   $B_2O_3$ is provided in a range of 8.39 to 10.30 wt %;
   $Na_2O$ is provided in a range of 10.96 to 12.46 wt %;
   $K_2O$ is provided in a range of 1.12 to 2.11 wt %;
   $Li_2O$ is provided in a range of 0 to 1.00 wt %;
   NaF is provided in a range of 1.63 to 2.74 wt %;
   ZnO is provided in a range of 4.65 to 8.51 wt %;
   $TiO_2$ is provided in a range of 9.50 to 11.60 wt %;
   $MoO_3$ is provided in a range of 4.81 to 5.01 wt %;
   $Bi_2O_3$ is provided in a range of 8.93 to 10.20 wt %; and
   $CeO_2$ is provided in a range of 1.32 to 1.38 wt %.

8. The composition of claim 1, wherein the total content of $Na_2O$, $K_2O$, and $Li_2O$ is provided in a range of 12 to 16 wt %.

9. The composition of claim 1, wherein at least one of:
   the total content of $Na_2O$, $K_2O$, and $Li_2O$ is provided in a range of 13.5 to 15.0%.

10. A coating layer on a substrate, the coating layer being made from the composition of claim 1.

11. A cooking appliance having at least one surface including the coating layer of claim 10 on a substrate.

12. A method for preparing the composition of enamel of claim 1, the method comprising:
    providing a material of the composition for enamel,
    melting the material, and
    quenching the melted material.

13. The method of claim 12, wherein the material of the composition comprises 5 wt % or more of $Na_2O$.

14. The method of claim 12, wherein a total content of $TiO_2$, $MoO_3$, $Bi_2O_3$, $CeO_2$, and at least one of $MnO_2$, $Fe_2O_3$, or $Co_3O_4$ is 40 wt % or less.

15. A composition for enamel prepared using the method of claim 12.

16. A coating layer made from the composition of claim 15.

17. A cooking appliance including the coating layer of claim 16.

18. A cooking appliance, comprising:
    a cavity having a cooking space therein;
    a door to open or close the cooking space;
    at least one heat source configured to provide heat in the cooking space; and a coating layer formed by coating the composition of claim 1 on at least one of an inner surface of the cavity, an inner surface of the door, or an inner surface of a door glass of the door.

19. A cooking appliance, comprising:

a glass plate;

at least one heat source provided below the glass plate and configured to provide heat; and a coating layer formed by coating the composition of claim 1 on an upper surface of the glass plate.

\* \* \* \* \*